US011630780B2

(12) United States Patent
Li

(10) Patent No.: US 11,630,780 B2
(45) Date of Patent: *Apr. 18, 2023

(54) FLASH MEMORY CONTROLLER MECHANISM CAPABLE OF GENERATING HOST-BASED CACHE INFORMATION OR FLASH-MEMORY-BASED CACHE INFORMATION TO BUILD AND OPTIMIZE BINARY TREE WITH FEWER NODES WHEN CACHE STORES DATA FROM HOST

(71) Applicant: Silicon Motion, Inc., Hsinchu County (TW)

(72) Inventor: Kuan-Hui Li, Chiayi (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,844

(22) Filed: Oct. 6, 2021

(65) Prior Publication Data

US 2022/0027282 A1 Jan. 27, 2022

Related U.S. Application Data

(63) Continuation of application No. 16/821,996, filed on Mar. 17, 2020, now Pat. No. 11,176,049.

(51) Int. Cl.
*G06F 12/08* (2016.01)
*G06F 12/0888* (2016.01)
*G06F 3/06* (2006.01)

(52) U.S. Cl.
CPC .......... *G06F 12/0888* (2013.01); *G06F 3/061* (2013.01); *G06F 3/0656* (2013.01); *G06F 3/0679* (2013.01); *G06F 2212/604* (2013.01)

(58) Field of Classification Search
None
See application file for complete search history.

(56) References Cited

U.S. PATENT DOCUMENTS

| 9,436,599 | B2 | 9/2016 | Cheng |
| 2010/0174862 | A1 | 7/2010 | Dinerstein |
| 2015/0248354 | A1 | 9/2015 | Sano |
| 2020/0379674 | A1 | 12/2020 | Li |

FOREIGN PATENT DOCUMENTS

TW        I567554 B       1/2017

*Primary Examiner* — Kevin Verbrugge
(74) *Attorney, Agent, or Firm* — Winston Hsu

(57) ABSTRACT

A flash memory controller includes a processor and a cache. When the processor receives a specific write command and specific data a host, the processor stores the specific data into a region of the cache, and the processor generates host-based cache information or flash-memory-based cache information to build or update/optimize a binary tree with fewer number of nodes to improve the searching speed of the binary tree, reducing computation overhead of multiple cores in the flash memory controller, and minimizing the number of accessing the cache to reduce the total latency wherein the host-based cache information may indicate dynamic data length and flash-memory-based cache information indicates the data length of one writing unit such as one page in flash memory chip.

9 Claims, 13 Drawing Sheets

FLASH MEMORY CONTROLLER MECHANISM CAPABLE OF GENERATING HOST-BASED CACHE INFORMATION OR FLASH-MEMORY-BASED CACHE INFORMATION TO BUILD AND OPTIMIZE BINARY TREE WITH FEWER NODES WHEN CACHE STORES DATA FROM HOST

CROSS REFERENCE TO RELATED APPLICATIONS

This application is a continuation application of U.S. application Ser. No. 16/821,996, filed on 2020 Mar. 17, the contents of which are incorporated herein by reference.

BACKGROUND OF THE INVENTION

1. Field of the Invention

The invention relates to a memory device, and more particularly, to flash memory controllers, corresponding memory devices, and corresponding methods applied in the flash memory controllers.

2. Description of the Prior Art

When a host wants to write data into a flash memory module via a flash memory controller, the host will send the data to the flash memory controller and the data is temporarily stored in a cache or a buffer within the flash memory controller, and the data is written into the flash memory module when the amount of data temporarily stored in the cache reaches a predetermined value. For example, the flash memory controller continuously receives the data from the host and stores the received data into the cache, and when the amount of the received data is enough to be written into several word lines of the flash memory module, the flash memory controller starts to move the data from the cache to the flash memory module.

Because the cache in the flash memory controller temporarily stores the data that has not been written into the flash memory module, when the host wants to the read this data, the flash memory controller can directly send the data stored in the cache to the host to shorten the access time. In detail, each data stored in the cache of the flash memory controller comprises a corresponding logical address, and when the host sends a read command comprising a specific logical address, the flash memory controller will search the logical addresses of the data temporarily stored in the cache to determine if one of the logical addresses meets the specific logical address, and if the cache has the data corresponding to the specific logical address, the flash memory controller can directly send the data to the host. However, if the data corresponding to the specific logical address is updated in a short time, that is the host transmits two or more data corresponding to the same specific logical address within a short time, the cache of the flash memory controller may have two or more data having the specific logical address, wherein the last data having the specific logical address is the valid data, and the previous data having the specific logical address is regarded as the invalid data. Therefore, to make sure that the flash memory controller able to send the valid data to the host, when the host sends the read command comprising the specific logical address, the flash memory controller needs to search all of the logical addresses of the data temporarily stored in the cache, causing the flash memory controller to be inefficient. In addition, because one logical address may correspond to two or more data within the cache, the conventional binary search method is not suitable for the flash memory controller.

SUMMARY OF THE INVENTION

Therefore one of the objectives of the invention is to provide a flash memory controller, which can generate host-based or flash-memory-based cache information to build and optimize a binary tree with fewer nodes when the cache of the flash memory controller stores the data from the host, so as to significantly improve the searching speed of the binary tree, reducing computation overhead of multiple cores in the flash memory controller, and minimizing the number of accessing the cache (particularly DRAM) to significantly reduce the total latency, to solve the above-mentioned problems.

According to an embodiment of the invention, a flash memory controller is disclosed. The controller comprises an internal bus, a read-only memory, a control logic circuit, a processor, and a cache. The interface circuit is coupled between a host and an internal bus. The read-only memory is coupled to the internal bus, for storing a program code. The control logic circuit is coupled between the internal bus and a flash memory module which is externally coupled to the flash memory controller. The processor is coupled to the internal bus, and is used for executing the program code to perform access of the flash memory module by using the control logic circuit. The cache is coupled to the internal bus. The flash memory module comprises a plurality of chips each comprising a plurality of pages each comprising a plurality of sectors. When the processor receives a specific write command and specific data having data amount of N sectors from the host via the interface circuit and the internal bus, the processor stores the specific data into a region of the cache, and the processor builds or updates a binary tree by adding a specific node into the binary tree wherein the specific node has node information comprising a node index, a logical address carried by the specific write command, a cache index corresponding to the region of the cache, a left node, a right node, a sector length corresponding to the data amount of N sectors; and when the processor receives a read command from the host to ask for a certain data which is buffered in the cache, the processor is arranged to use node information of node (s) recorded in the binary tree to obtain the certain data from the cache and to send the certain data to the host without controlling the control logic circuit to perform access of the flash memory module.

According to an embodiment, a memory device is disclosed. The memory device comprises the above-mentioned flash memory module and flash memory controller.

According to an embodiment, a method of a flash memory controller is disclosed. The method comprises: providing an interface circuit coupled between a host and an internal bus; providing a control logic circuit coupled between the internal bus and a flash memory module which is externally coupled to the flash memory controller, the flash memory module having a plurality of chips each comprising a plurality of pages each comprising a plurality of sectors; providing a cache coupled to the internal bus; when receiving a specific write command and specific data having data amount of N sectors from the host via the interface circuit and the internal bus, storing the specific data into a region of the cache, and building or updating a binary tree by adding a specific node into the binary tree wherein the specific node has node information comprising a node index, a logical address carried by the specific write command, a cache index corresponding to the region of the cache, a left node, a right node, a sector length corresponding to the data amount of N sectors; and when receiving a read command from the host to ask for a certain data which is buffered in the cache, using node information of node(s) recorded in the binary tree to obtain the certain data from the cache and to send the certain data to the host without controlling the control logic circuit to perform access of the flash memory module.

According to an embodiment, a flash memory controller is disclosed. The controller comprises an internal bus, a read-only memory, a control logic circuit, a processor, and a cache. The interface circuit is coupled between a host and an internal bus. The read-only memory is coupled to the internal bus and used for storing a program code. The control logic circuit is coupled between the internal bus and a flash memory module which is externally coupled to the flash memory controller. The processor is coupled to the internal bus and used for executing the program code to perform access of the flash memory module by using the control logic circuit. The cache is coupled to the internal bus. The flash memory module comprises a plurality of chips each comprising a plurality of pages each comprising a plurality of sectors. When the processor receives a specific write command and specific data having data amount of N sectors from the host via the interface circuit and the internal bus, the processor compares the data amount of N sectors with a data amount of a minimum writing unit within the flash memory module to determine whether to generate flash-memory-based cache information to build or update a binary tree.

According to an embodiment, a memory device is disclosed. The memory device comprises a flash memory module and the flash memory controller mentioned above.

According to an embodiment, a method of a flash memory controller is disclosed. The method comprises: providing an interface circuit, coupled between a host and an internal bus; providing a control logic circuit, coupled between the internal bus and a flash memory module which is externally coupled to the flash memory controller, the flash memory module having a plurality of chips each comprising a plurality of pages each comprising a plurality of sectors; providing a cache coupled to the internal bus; and when receiving a specific write command and specific data having data amount of N sectors from the host via the interface circuit and the internal bus, comparing the data amount of N sectors with a data amount of a minimum writing unit within the flash memory module to determine whether to generate flash-memory-based cache information to build or update a binary tree.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
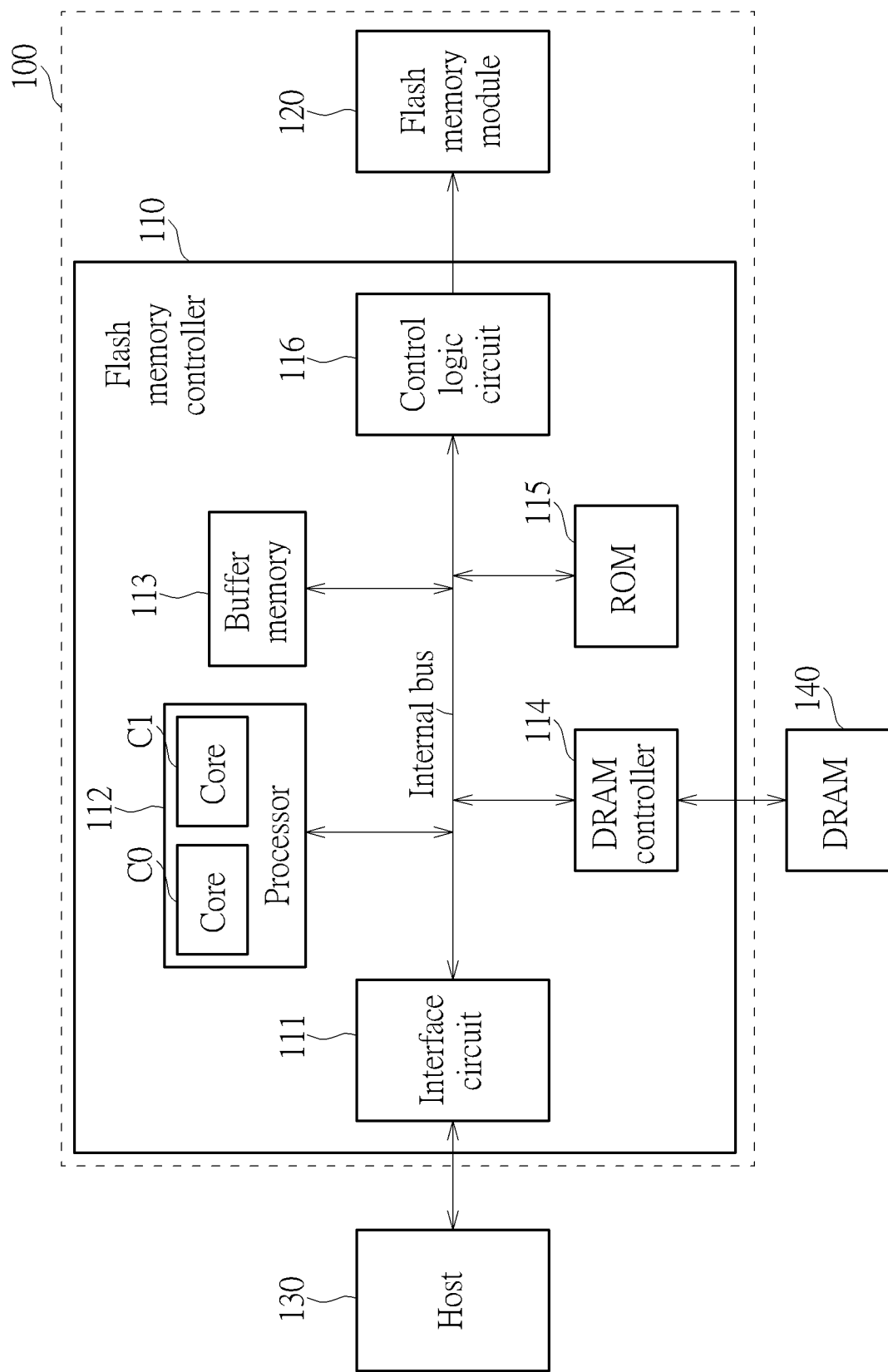
FIG. 1 is a block diagram of a memory device 100 according to an embodiment of the invention.

FIG. 1 is a block diagram of a memory device 100 according to an embodiment of the invention. As shown in FIG. 1, the memory device 100 comprises a flash memory controller 110 and a flash memory module 120 wherein the flash memory controller 110 is arranged to access the flash memory module 120. The flash memory controller 110 comprises an interface circuit 111, a processor 112, a buffer memory 113, a dynamic random access memory (DRAM) controller 114, a read-only memory (ROM) 115, and a control logic circuit 116. The processor 112 may be a microprocessor or a central processing unit comprising two cores C0 and C1. The ROM 115 is used to store a program core, and the processor 112 executes the program core to control the access of the flash memory module 120. The core C0 is mainly configured to control the operations between the flash memory controller 110 and the host 130, and the core C1 of the processor 112 is mainly configured to control the operations between the flash memory controller 110 and the flash memory module 120. In addition, the DRAM controller 114 is arranged to access a DRAM 140 positioned external to the flash memory controller 110.

The flash memory module 120 may comprise one or more flash memory chips each comprising a plurality of blocks, and each block is a minimum erasing unit. In addition, each block comprises a plurality of pages, and each page may be a minimum writing unit. For example, the size of one page may be 64 KB (i.e. 128 sectors); however, this is not intended to be a limitation. In addition, the flash memory module 120 may be a 3D NAND-type flash memory module.

In one embodiment, the memory device 100 may be a portable memory device (e.g. a memory card conforming to SD/MMC, CF, MS or XD specifications), and the host 130 may be an electronic device that is connectable with a portable memory device, for example, mobile phones, laptop computers, personal computers, etc. In another embodiment, the memory device 100 may be a solid state drive (SSD) or an embedded storage device conforming to Universal Flash Storage (UFS) or Embedded Multi Media Card (EMMC) specifications, for being configured in an electronic device (for example, in a mobile phone, a laptop computer or a personal computer), and the host 130 may be a processor within this electronic device.

In the embodiment, the buffer memory 113 and/or DRAM 140 can be used as a cache (or called controller cache) of the flash memory controller 110 to temporarily store data sent from the host 130 before the data is written into the flash memory module 120 so that data currently cached in the cache can be rapidly or fast retrieved from the cache to send the data to the host 130 if the host 130 sends a read command to request the data and the data is currently buffered in the cache. That is, the cache of flash memory controller 110 may be the buffer memory 113 included within the controller 110, at least one portion of DRAM 140 externally coupled to the controller 110, and/or a combination of buffer memory 113 and DRAM 140.

In practice, when the host 130 sends a write command with data to the controller 110 so as to control the controller 110 writing the data into the flash memory module 120, the data is temporarily stored in the data cache wherein the data cache for example is the DRAM 140 (but not limited). The data is moved from the cache and then written into the flash memory module 120 when the amount of the data stored in the buffer memory 113 or the DRAM 140 reaches a predetermined value (e.g. the data amount corresponding to several one or more word lines of the flash memory module 120 or one page size data). In this embodiment, when the host 130 sends a read command to ask for data whose logical address is recorded in the cache, the flash memory controller 110 can directly access the cache to send such data to the host 130 without accessing the flash memory module 120. Thus, the response time of the flash memory controller 110 can be reduced.

A conventional controller needs to search all of the logical addresses of all data temporarily stored in a controller cache to make sure that the flash memory controller can get the valid data. Compared to the prior art, in this embodiment, to increase the searching speed as well as reducing the latency of accessing the cache (more particularly the DRAM 140), the processor 112 is arranged to build a binary tree with fewer or minimum number of nodes (i.e. optimize the binary tree) when the data is received from the host 130 based on the data size/length of the minimum writing unit of the flash memory module 120 or the identical/different data sizes/lengths corresponding to different write commands sent from the host 130.

When the host 130 sends the read command to the flash memory controller 110, the processor 112 can search the logical address by using the binary tree to more quickly obtain the required data, to significantly improve the efficiency of the flash memory controller 110 as well as reducing the frequency of accessing the cache so as to reduce the latency of DRAM 140. Since accessing the cache based on (host-based or flash-memory-based) cache information of a corresponding node of a binary tree may also cause some latency if the cache is implemented by using the DRAM 140, the binary tree with fewer or minimum number of nodes can significantly reduce the latency of DRAM 140 so as to effectively reduce the response time of the controller 110.

FIGS. 2-5 show the examples of operations of the controller 110 for building and updating the binary tree 220 when the flash memory controller 110 receives the data from the host 130 according to one embodiment of the invention.

The host 130 for example wants to sequentially send a first write command and data D1 with the logical address LBA0, a second write command and data D2 with the logical address LBA64, and a third write command and data D3 with the logical address LBA192 to the controller 110 so as to write the above-mentioned data into the flash memory module 120. The data D1 for example has data amount of 64 sectors, the data D2 for example has data amount of 128 sectors, and the data D3 for example has data amount of 256 sectors. The sector is a smaller storage unit of a flash memory and for example one page may comprise 128 sectors. However, the examples are not intended to be limitations.

For instance, the memory device 100 may operate under a sequential write mode in which the host 130 is allowed to continuously send and write a large amount of data into the memory device 100. However, this is not intended to be a limitation; the memory device 100 may operate under a single write mode. Alternatively, the host 130 may want to sequentially write different data having the same data amount to the memory device 100. That is, the host 130 is arranged to sequentially write data which may respectively have identical/different data amounts to the memory device 100.

Figure 2:
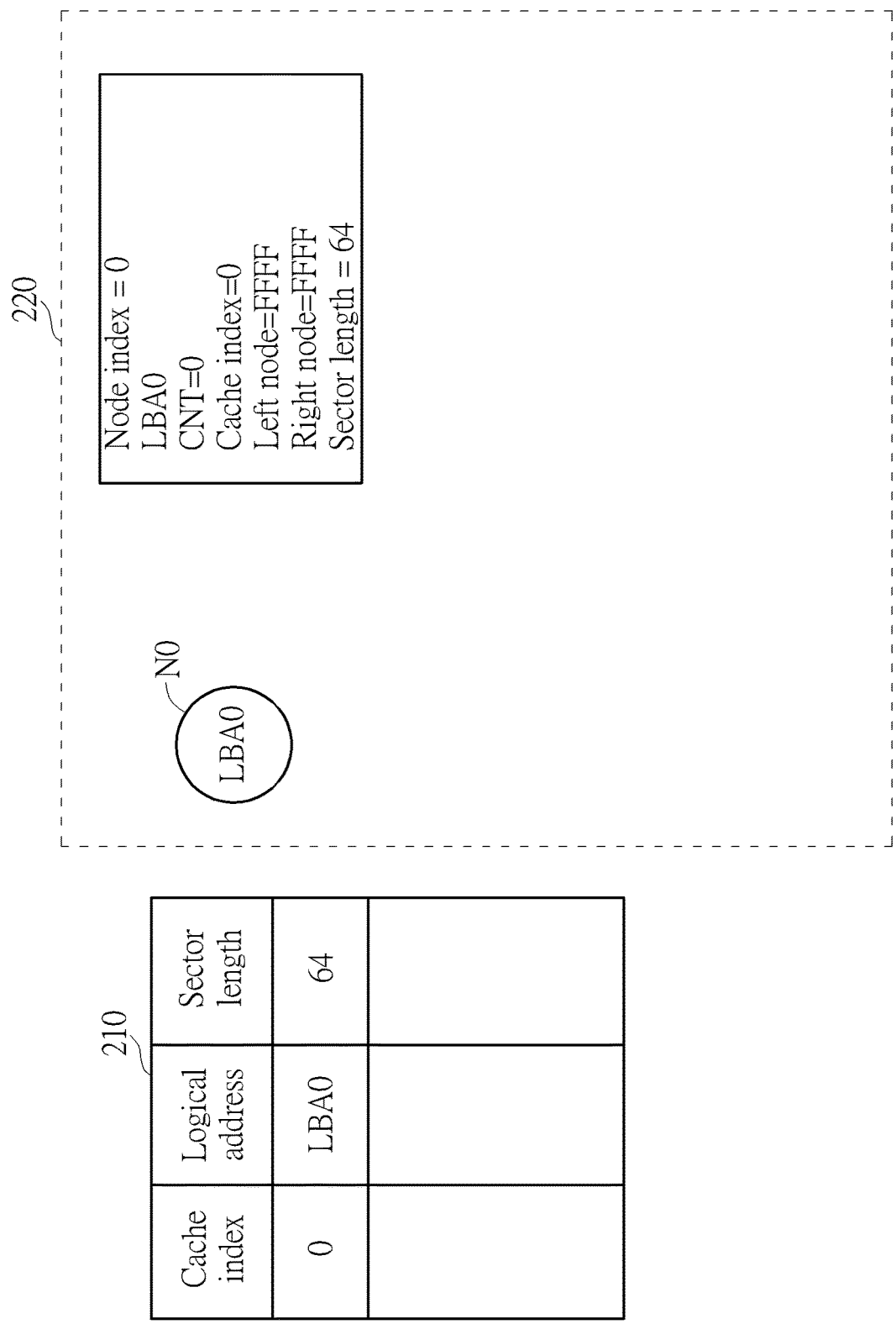
FIG. 2 is diagram showing an example of the operation of flash memory controller in FIG. 1 for building and inserting node N0 to update the binary tree when the flash memory controller receives data D1 from the host.

In FIG. 2, when the host 130 sends the first write command and data D1 with the logical address LBA0 to the flash memory controller 110, and the core C0 stores the data D1 with the logical address LBA0 to a cache such as DRAM 140 (hereinafter, the DRAM 140 is used as an example). In this embodiment, the data D1 is stored in a region corresponding to a cache index "0" of the DRAM 140 (in this example the cache index is also referred to as DRAM index), and the DRAM 140 comprises a table 210 recording the cache index "0", the corresponding logical address LBA0, and the data size of data D1 wherein the data size for example is specified by the number of sectors, i.e. sector length "64". The cache index for example is used to indicate the starting location of a storage region in the DRAM 140 for a specific data. For example, the relation between DRAM index and sector length is that each time the DRAM index increasing one corresponds to the data size of eight sectors (but not limited) in the DRAM 140; in other embodiments, the number of sectors may be changed and different.

The starting location of a storage region in the DRAM 140 for the data D1 is at zero and the sector length is "64", and thus the starting location of the storage region in the DRAM 140 for the next data (i.e. the data D2) will be at "8".

Simultaneously, the core C0 sends the cache information (i.e. the cache index "0", logical address LBA0, and the sector length "64"), i.e. host-based cache information, to the core C1 to indicate that the data D1 is stored in the DRAM 140. Then, when the core C1 is idle (e.g. at the busy time of the flash memory module 120), the core C1 can start to build the binary tree 220 according to the cache information sent from the core C0.

Taking FIG. 2 as an example, the logical address LBA0 is the node N0 (top node) of the binary tree, and the binary tree 220 also records the node information comprising the node index "0", logical address (i.e. LBA0), the duplicate count CNT of the logical address LBA0 (because the DRAM 140 has only one logical address LBA0, the duplicate count CNT=0), the cache index "0", the node index of the left node (left child), the node index of the right node (right child), and the sector length "64". In addition, the node indices of the left node and the right node are "FFFF" because in this condition no nodes follow the top node corresponding to LBA0.

Figure 3:
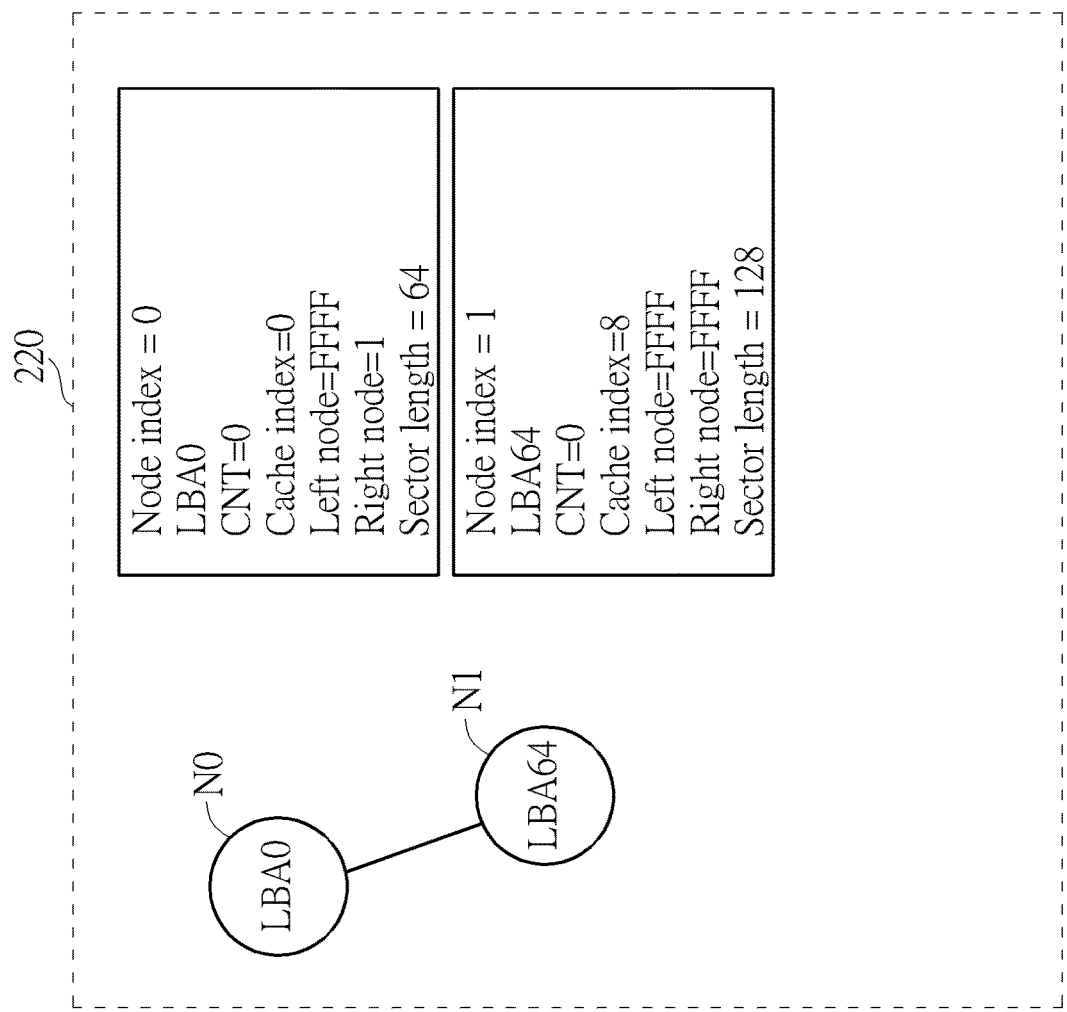
FIG. 3 is diagram showing an example of the operation of flash memory controller in FIG. 1 for inserting node N1 to update the binary tree when the flash memory controller receives data D2 from the host.

Then, in FIG. 3, the host 130 sends the second write command and data D2 with the logical address LBA64 to the flash memory controller 110 as shown in FIG. 3, and the core C0 stores the data D2 with the logical address LBA64 to the DRAM 140. In this embodiment, the data D2 is stored in a region corresponding to a cache index "8" of the DRAM 140, and the table 210 records the cache index "8", the corresponding logical address LBA64, and the sector length "128". The starting location of the storage region in the DRAM 140 for the data D2 is at 8 and the data D2 has the data size of 128 sectors, and thus the starting location of the storage region in the DRAM 140 for the next data (i.e. the data D3) will be at 24. Simultaneously, the core C0 sends the cache information (i.e. the cache index "8", logical address LBA64, and the sector length "128") to the core C1 to indicate that the data D2 is stored in the DRAM 140. Then, when the core C1 is idle, the core C1 updates the binary tree 220 according to the cache information sent from the core C0.

Taking FIG. 3 as an example, the logical address LBA64 is the right node following the top node of the binary tree (because the logical address LBA64 is greater than the logical address LBA0), and the binary tree 220 records the node information comprising the node index "1", logical address (i.e. LBA64), the duplicate count CNT of the logical address LBA64 (because the DRAM 140 has only one logical address LBA64, the duplicate count CNT=0), the cache index "8", the node index of the left node and the node index of the right node, and the sector length "128" wherein the node indices of the left node and the right node are "FFFF" because no nodes follow the node corresponding to the logical address LBA64. In addition, because the node index '1' corresponding to the logical address LBA64 is added to the right node of the node N0 corresponding to the logical address LBA0, the right node of the node N0 is updated to '1'.

Figure 4:
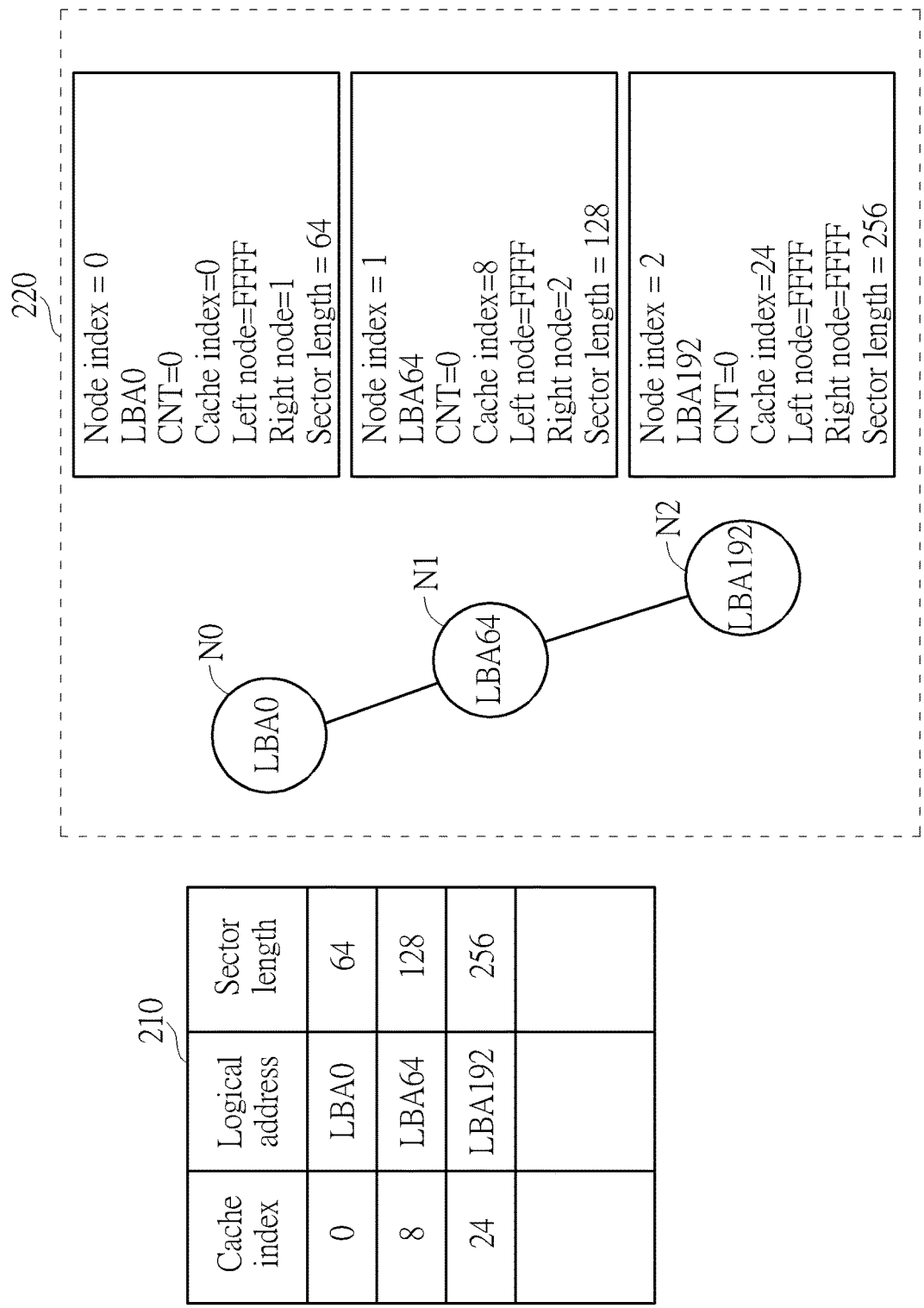
FIG. 4 is diagram showing an example of the operation of flash memory controller in FIG. 1 for inserting node N2 to update the binary tree when the flash memory controller receives data D3 from the host.
Figure 5:
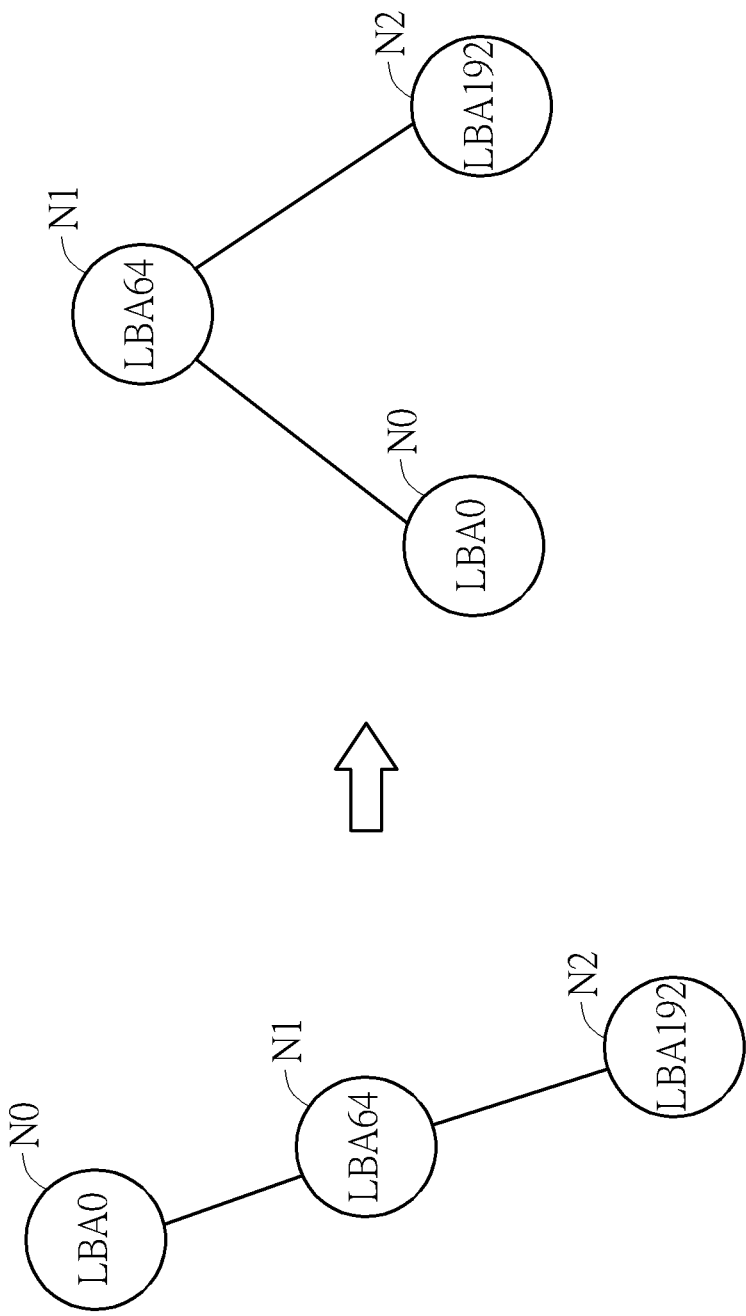
FIG. 5 is a diagram showing that the processor re-arranges the binary tree to lower the layers according to one embodiment of the present invention.

Then, in FIG. 4, the host 130 sends the third write command and data D3 with the logical address LBA192 to the flash memory controller 110 as shown in FIG. 4, and the core C0 stores the data D3 with the logical address LBA192 to the DRAM 140. In this embodiment, the data D3 having the data amount of 256 sectors is stored in a region corresponding to a cache index "24" of the DRAM 140, and the table 210 records the cache index "24", the corresponding logical address LBA192, and the sector length "256". Simultaneously, the core C0 sends the cache information (i.e. the cache index "24", the logical address LBA192, and the sector length "256") to the core C1 to indicate that the data D3 is stored in the DRAM 140. Then, when the core C1 is idle, the core C1 updates the binary tree 220 according to the cache information sent from the core C0.

Taking FIG. 4 as an example, the node index "2" corresponding to the logical address LBA192 is at the right node following the node index "1" of the logical address LBA64 of the binary tree (because the logical address LBA192 is greater than the logical address LBA64), and the binary tree 220 further records the node information comprising the node index "2", logical address (i.e. LBA192), the duplicate count CNT of the logical address LBA192 (because the DRAM 140 has only one logical address LBA192, the duplicate count CNT=0), the cache index "24", the node index of the left node and the node index of the right node, and the sector length "256" wherein the node indices of the left node and the right node are "FFFF" because no nodes follow the node of LBA192. In addition, because node index "2" corresponding to the logical address LBA192 is added to the right node of node index "1" corresponding to the logical address LBA4, the right node of node index "1" is updated to node index "2".

In one embodiment, if the flash memory controller 110 receives a read command comprising the logical address LBA64 from the host 130, taking the binary tree 220 shown in FIG. 4 as an example, the processor 112 compares the logical address LBA64 with the logical address LBA0 of the top node of the binary tree 220, and because the logical address LBA64 is greater than the logical address LBA0, the processor 112 finds the right node of the top node in the next step. Then, because the right node of the top node of the binary tree 220 corresponds to the logical address LBA64 that meets the logical address in the read command, the processor 112 can refer to the cache index "8" of the binary tree 220 to obtain the cache address of the required data, and the processor 112 controls DRAM controller 114 reading the data D2 stored in the region corresponding to cache index "8" and transmitting the data D2 to the host 130 via the interface circuit 111, without accessing the flash memory module 120. In light of above, because the embodiment uses only two steps to find the required data, compared within the conventional art using three steps to find the required data, the embodiment indeed improve the searching speed.

In addition, if the flash memory controller 110 receives a read command comprising the logical address LBA7 from the host 130, taking the binary tree 220 shown in FIG. 4 as an example, the processor 112 can determine that the logical address LBA7 is not stored in the DRAM 140. Then, the processor 112 may control the control logic circuit 116 reading the data having the logical address LBA7 from the flash memory module 120 and then sending the data to the host 130 via the interface circuit 111. The flash memory controller 110 can quickly determine if the logical address LBA7 is stored in the cache (such as DRAM 140) or not, the reading speed of the flash memory controller 110 can be improved.

In one embodiment, the core C1 in the idle time can re-arrange the binary tree 220 to lower the number of layers. For example, the core C1 may use a self-balancing binary search tree algorithm such as AVL tree or red-black tree to lower the number of layers. Taking FIG. 5 as an example, the binary tree 220 can be rotated so that the logical address LBA64 becomes the top node, the node of logical address LBA0 becomes the left node of the logical address LBA64, therefore, the binary tree 220 is updated from three layers to two layers, and the searching speed can be further improved.

For the cache being implemented by using the DRAM 140, the flash memory controller 110 for example is arranged to control the DRAM controller 114 and control logic circuit 116 moving and writing the data size of the minimum writing unit such as one page from the data buffered in the cache into the flash memory module 120 each time when the amount of data to be written into the flash memory module 120 reaches the predetermined value (e.g. one or more pages, one or more word line . . . ). The core C0 is arranged to correspondingly update the information recorded in the table 210 and to send appropriate information to the core C1 to notify that the binary tree 220 should be updated, and the core C1 in the idle time updates the binary tree to remove the related information.

The size of a minimum writing unit such as one page for example is equal to 64 KB, i.e. 128 sectors; however, this is not intended to be a limitation. That is, one page size data (e.g. data of 128 sectors) is moved from the DRAM 140 and then written into a corresponding page of the flash memory module 120 each time. Thus, in practice, data of 128 sectors formed by the data D1 and a portion (e.g. a first half) of the data D2, i.e. all the data D1 and a portion of data D2 corresponding to the cache index "8" with sector length "64", is for example moved from the DRAM 140 and then written into a page of the flash memory module 120. Then, data of 128 sectors formed by a second half of the data D2 and a partial portion of the data D3, i.e. the other portion of data D2 corresponding to the cache index "16" with sector length "64" and a portion of data D3 corresponding the cache index "24" and sector length "64", is moved from the DRAM 140 and then written into a next page of the flash memory module 120. That is, if the data amounts of different specific data to be written form the host 130 are different from the minimum writing unit of flash memory module 120, the different specific data are not sequentially and respectively written into the flash memory module 120.

Figure 6:
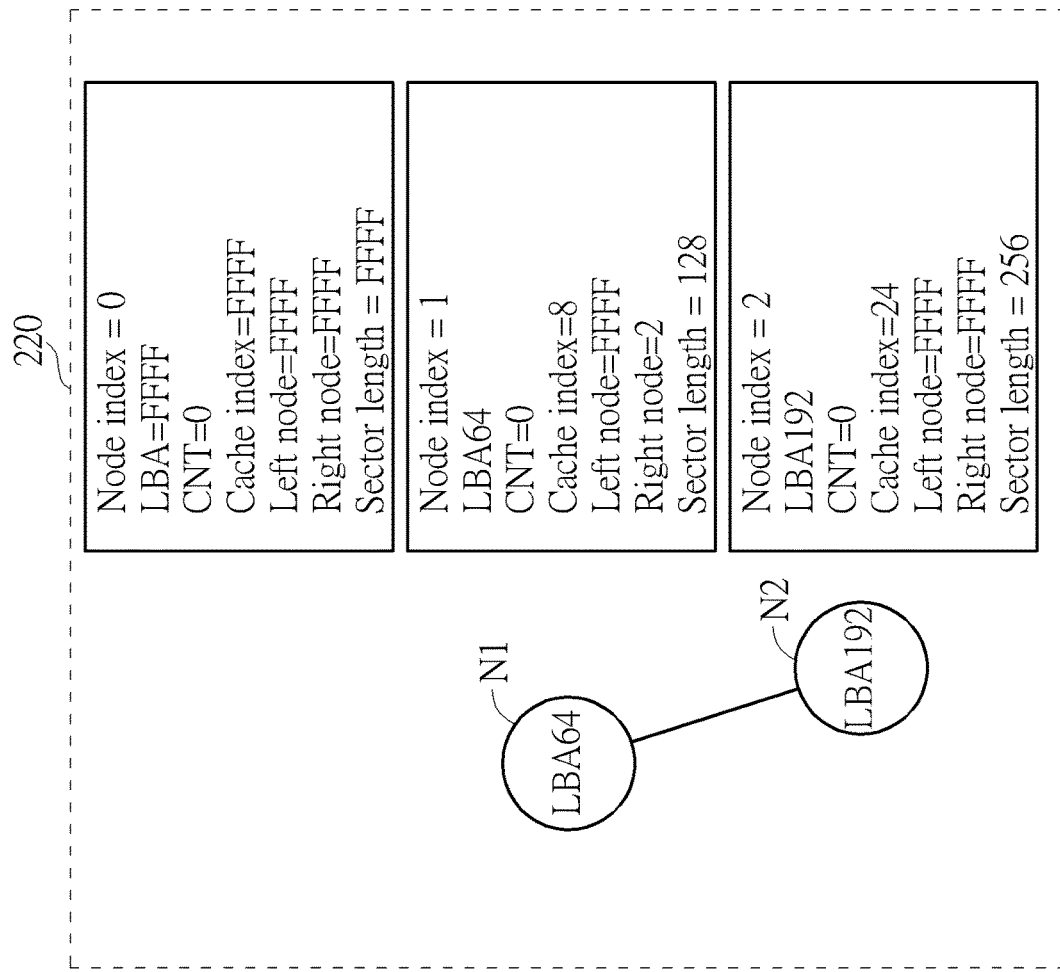
FIG. 6 is a diagram showing an example of operation of the flash memory controller in FIG. 1 for deleting node N0 from the binary tree to update the binary tree in FIG. 4 when data of 128 sectors formed by the data D1 and the first half of the data D2 is moved from the cache such as DRAM and then written into a page of the flash memory module.
Figure 7:
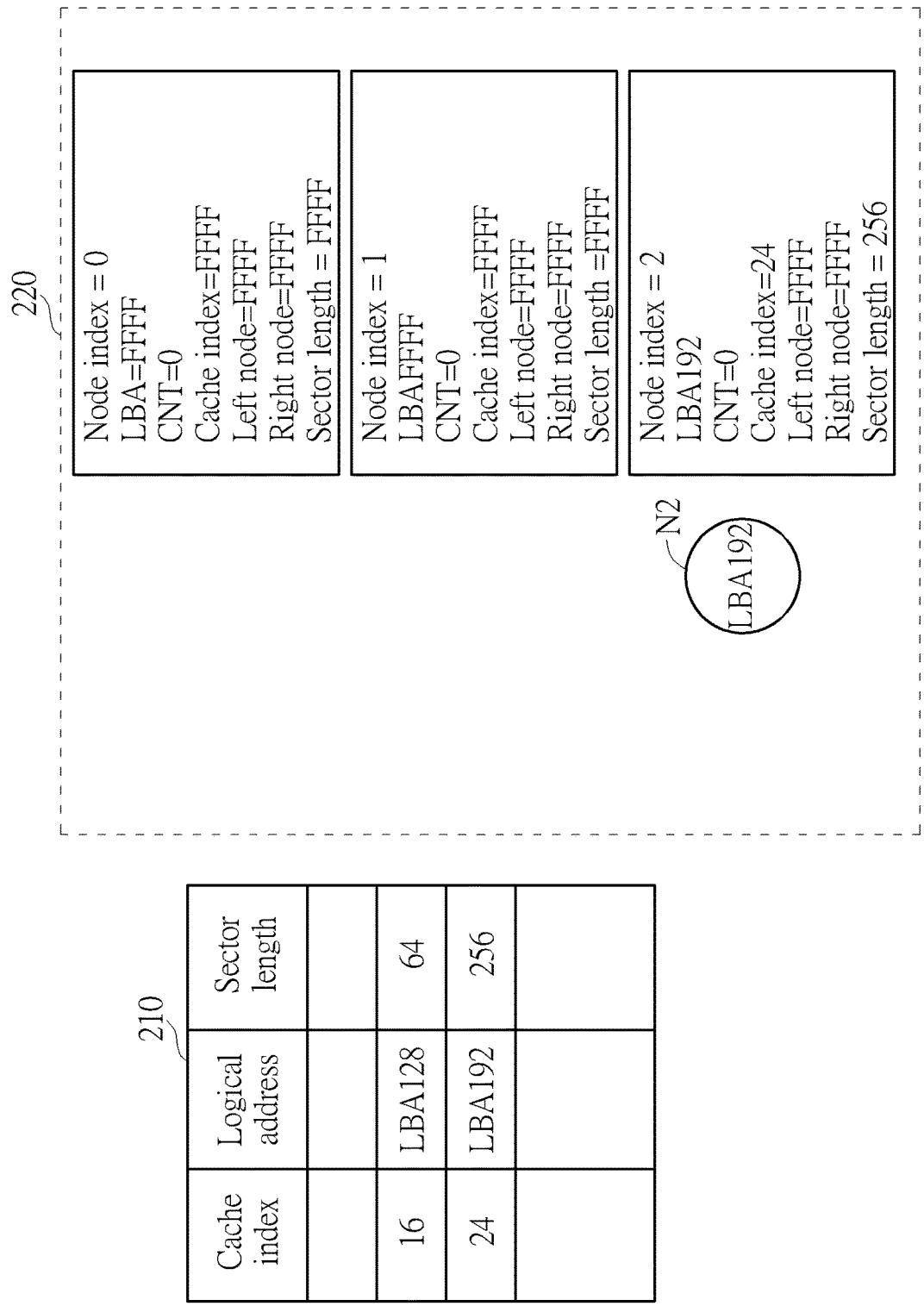
FIG. 7 is a diagram showing an example of operation of the flash memory controller in FIG. 1 for deleting node N1 from the binary tree to update the binary tree in FIG. 4 when data of 128 sectors formed by the data D1 and the first half of the data D2 is moved from the cache such as DRAM and then written into a page of the flash memory module.
Figure 8:
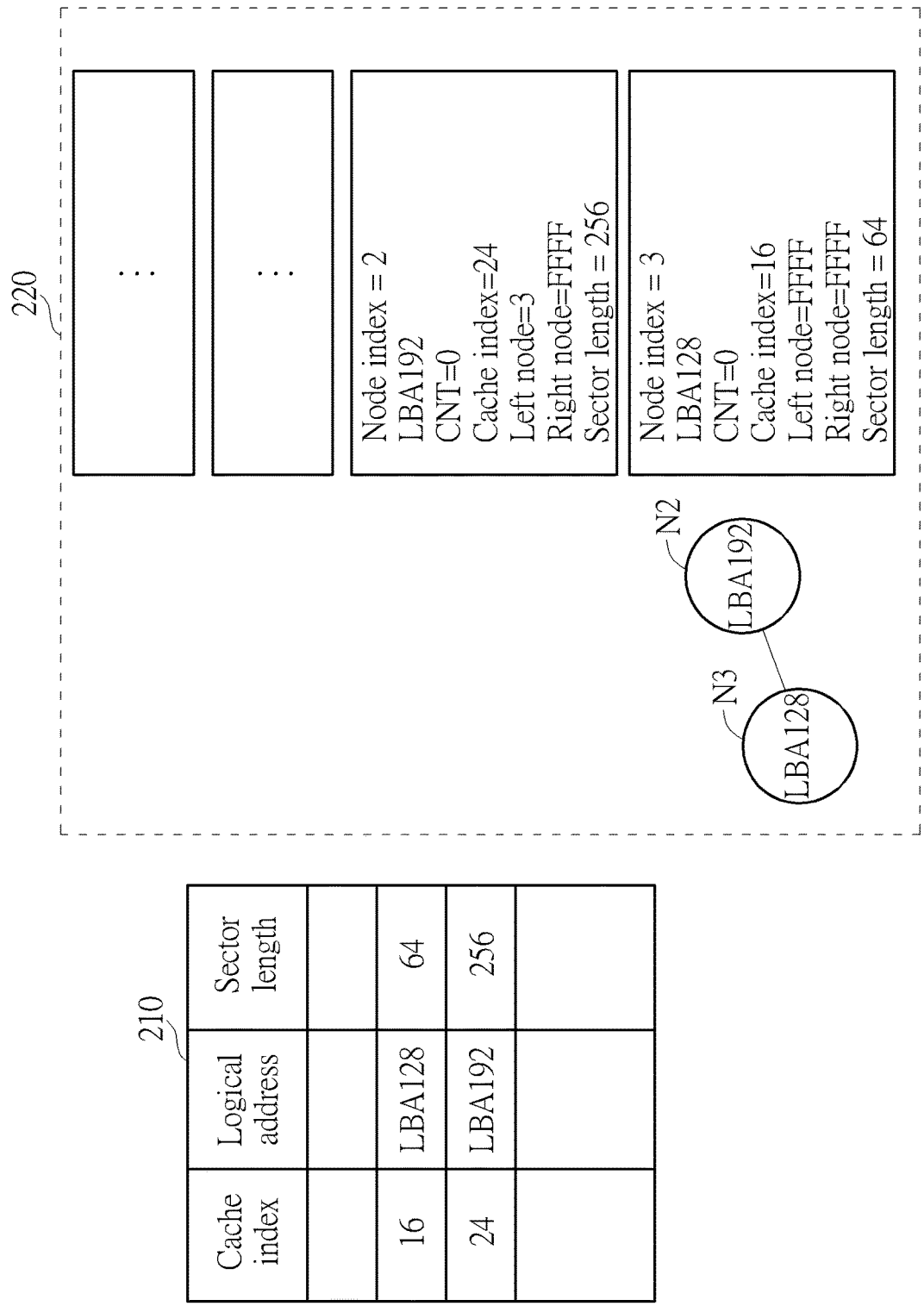
FIG. 8 is a diagram showing an example of operation of the flash memory controller in FIG. 1 for inserting a new node N3 into the binary tree to update the binary tree in FIG. 4 when data of 128 sectors formed by the data D1 and the first half of the data D2 is moved from the cache such as DRAM and then written into a page of the flash memory module.

FIGS. 6-8 show the example of operation of the controller 110 for updating the binary tree 220 in FIG. 4 when data of 128 sectors formed by the data D1 and the first half of the data D2 is moved from the DRAM 140 and then written into a page of the flash memory module 120. As shown in FIG. 6, in this situation, the data of 128 sectors formed by all the data D1 and the first half of data D2 is moved from the DRAM 140 into the flash memory module 120. Since all the data D1 is moved from the DRAM 140 to the flash memory module 120, the core C0 deletes corresponding cache information (i.e. cache index "0", logical address LBA0, and the sector length "64") and notifies the core C1 of that cache information being deleted. Then, the core C1 in the idle time is arranged to delete the node of node index "0" from the binary tree 220 and reset corresponding node information as the default value "FFFF". For example, for node index "0", its logical address LBA is reset as "FFFF", its duplicate count CNT is reset as "0", its cache index is reset as "FFFF", its left node is reset as "FFFF", its right node is reset as "FFFF", and its sector length is reset as "FFFF". The node of node index "1" becomes the top node, and the node information of node index "1" and node information of node index "2" is not changed. It should be noted that the table 210 can be maintained or updated by the core C1 without using the core C0 when moving buffered data from the cache into the flash memory module 120.

Then, since the first half of data D2 is moved from the DRAM 140 into the flash memory module 120, the core C0 is arranged to update cache information in the table 210, and the core C1 in the idle time is arranged to update the binary tree 220. For example, as shown in FIG. 7, the core C0 is used to update the original cache information (i.e. cache index "8", logical address LBA64, and sector length "128") as new cache information (cache index "16", logical address LBA128, and sector length "64"). The core C1 in the idle time deletes the node of node index "1" from the binary tree 220 and reset corresponding information as the default value "FFFF". For example, for node index "1", its logical address LBA is reset as "FFFF", its duplicate count CNT is reset as "0", its cache index is reset as "FFFF", its left node is reset as "FFFF", its right node is reset as "FFFF", and its sector length is reset as "FFFF". The node of node index "2" becomes the top node, and the node information of node index "2" is not changed.

As shown in FIG. 8, the core C0 notifies the core C1 of the new cache information (i.e. cache index "16", logical address LBA128, and sector length "64"), and based on the new cache information the core C1 is arranged to update the binary tree 220. For example, the core C1 adds/inserts a node N3 having node index "3" at the left child of the node having node index "2" wherein the node information of node N3 having node index "3" comprises logical address LBA128, duplicate count CNT=0, cache index "16", left node "FFFF", right node "FFFF", and the sector length "64". For the node having node index "2", its left node is updated as "3".

That is, for a specific data cached in the DRAM 140 and to be written by the host 130 to the flash memory module 120, if the data size of the specific data is different from the size of a minimum writing unit such as one page, in this embodiment, each time when a portion of the specific data is moved from the DRAM 140 into the flash memory module 120, the core C1 deletes a corresponding node and resets cache information and then adds/inserts a new node and corresponding cache information into the binary tree according to the cache index(es) corresponding to a remaining portion of the specific data.

Figure 9:
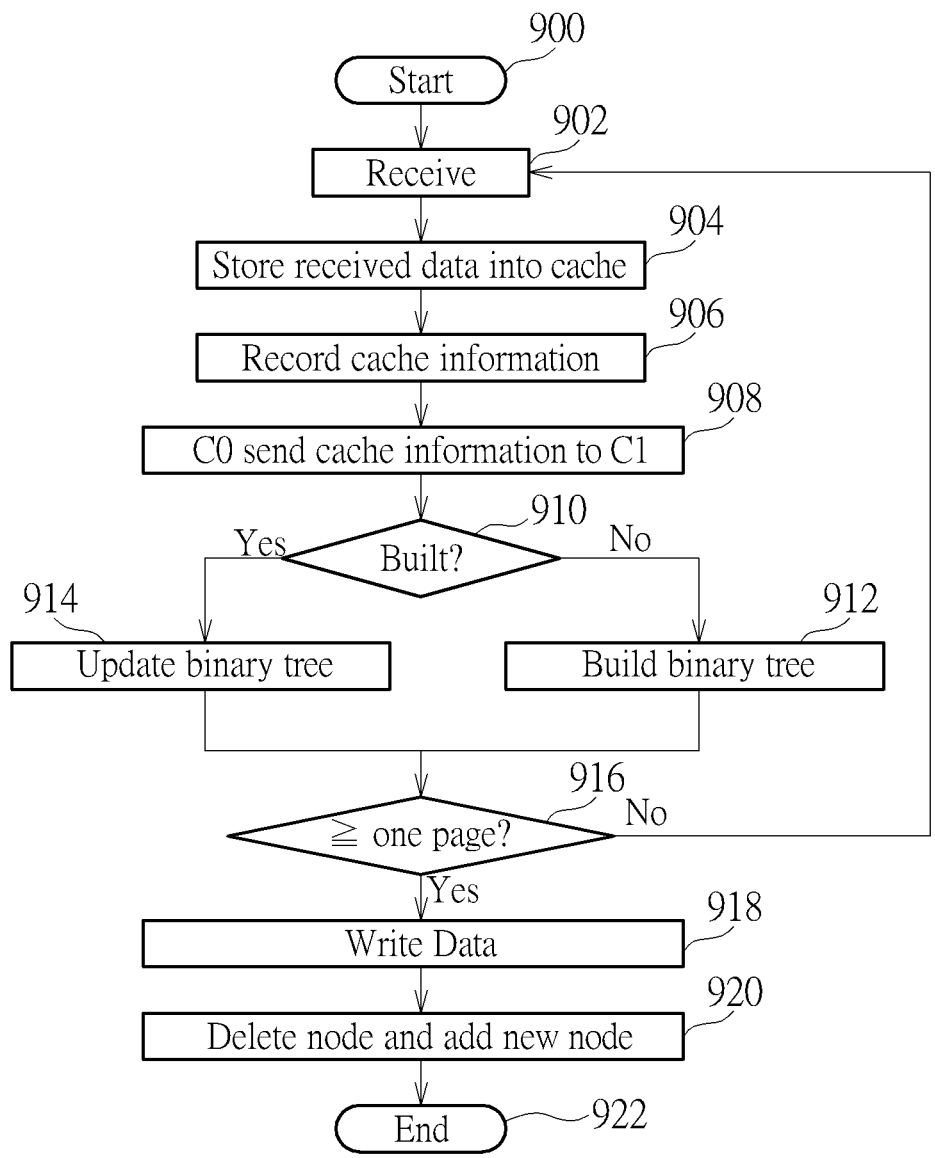
FIG. 9 is a flowchart diagram of a method for building or updating the binary tree when receiving data from the host according to one embodiment of the invention.

FIG. 9 is a flowchart diagram of a method for building or updating the binary tree 220 when receiving data from the host 130 according to one embodiment of the invention. Refer to FIGS. 1-4 and above descriptions, the flow is described as follows.

Step 900: Start;

Step 902: Receive data from the host 130;

Step 904: Core C0 stores/buffers the received data into a cache within the flash memory controller;

Step 906: Core C0 uses table 210 to record cache information comprising cache index, logical address, and data length of the received data;

Step 908: Core C0 sends the cache information to core C1;

Step 910: Core C1 determines whether a binary tree is built; if no binary trees are built, then the flow proceeds to Step 912; otherwise, the flow proceeds to Step 914;

Step 912: Core C1 build a binary tree which comprises a top node with corresponding caches information which records a top node index "0", logical address, cache index, left node, right node, and data length of the received data;

Step 914: Core C1 compares the logical address of the received data with one or more logical addresses of nodes existing in the binary tree to establish the node corresponding to the logical address of the received data and to record the corresponding cache information comprising a corresponding node index, the logical address, the cache index, left node, right node, and the data length of the received data;

Step 916: Flash memory controller 110 determines if amount of data stored in the cache reaches a predetermined value such as one page size data; if the amount of data stored in the cache reaches the predetermined value, then the flow proceeds to Step 918, otherwise, the flow proceeds to Step 902 to receive next data from the host 130;

Step 918: Core C1 moves one page size data from the cache such as DRAM 140 into the flash memory module 120 by controlling the DRAM controller 114 and control logic circuit 116;

Step 920: Core C1 when idle deletes one or more nodes from the binary tree and resets corresponding cache information as the default value "FFFF" and then adds a new node with corresponding cache information into the binary tree if necessary wherein the new node is used to indicate a remaining portion of data having another portion data which has been moved from the cache into the flash memory module 120; and Step 922: End.

In other embodiments, to reduce computation overheads when the core C1 deletes nodes and adds a new node, the flash memory controller 110 can be arranged to build the binary tree 220 based on the minimum writing unit such as one page of the flash memory module 120.

Figure 10:
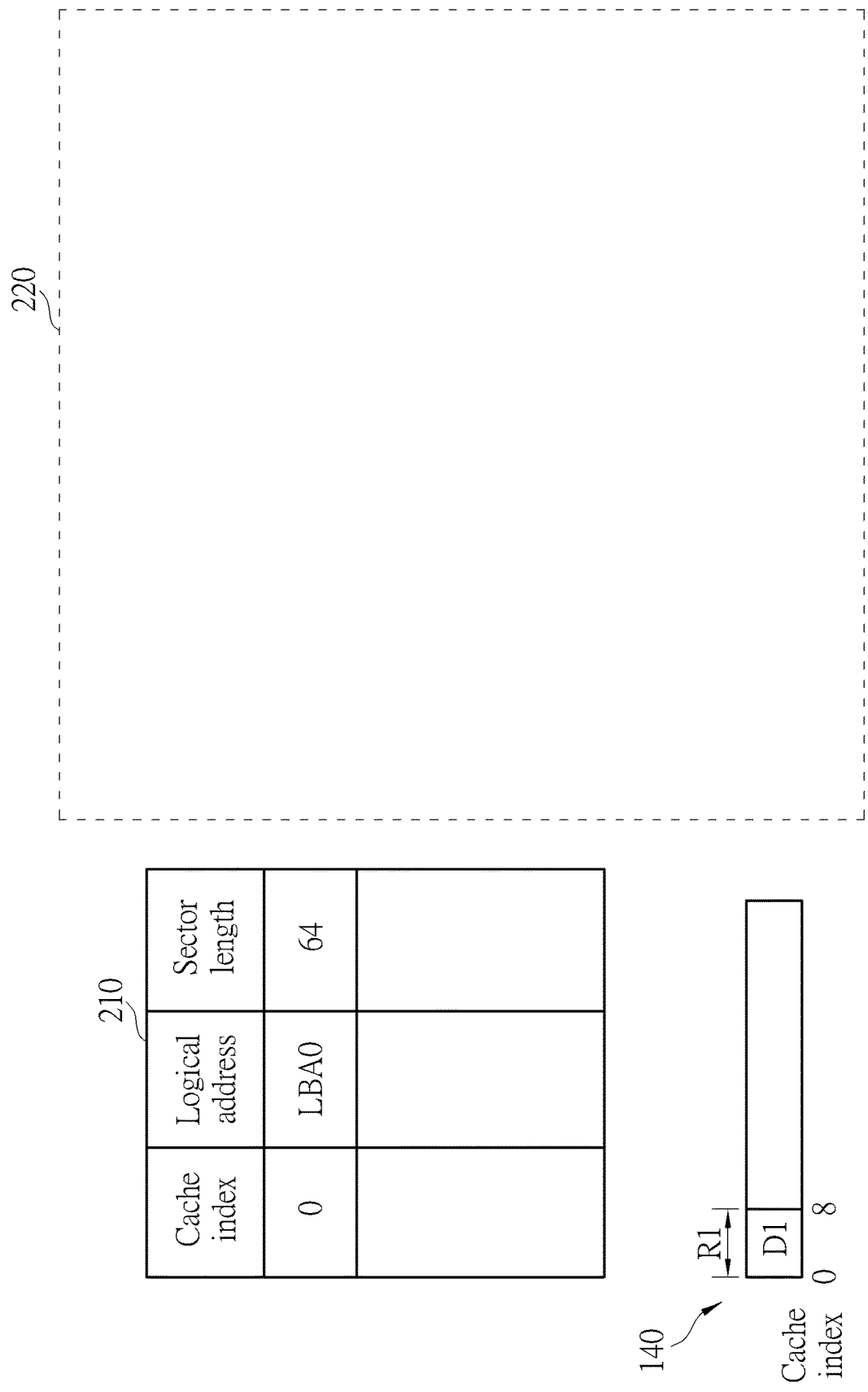
FIG. 10 is a diagram showing an example of operation of the flash memory controller for determining the data D1 as the remaining data portion R1 when the flash memory controller receives data D1 from the host according to another embodiment of the invention.
Figure 11:
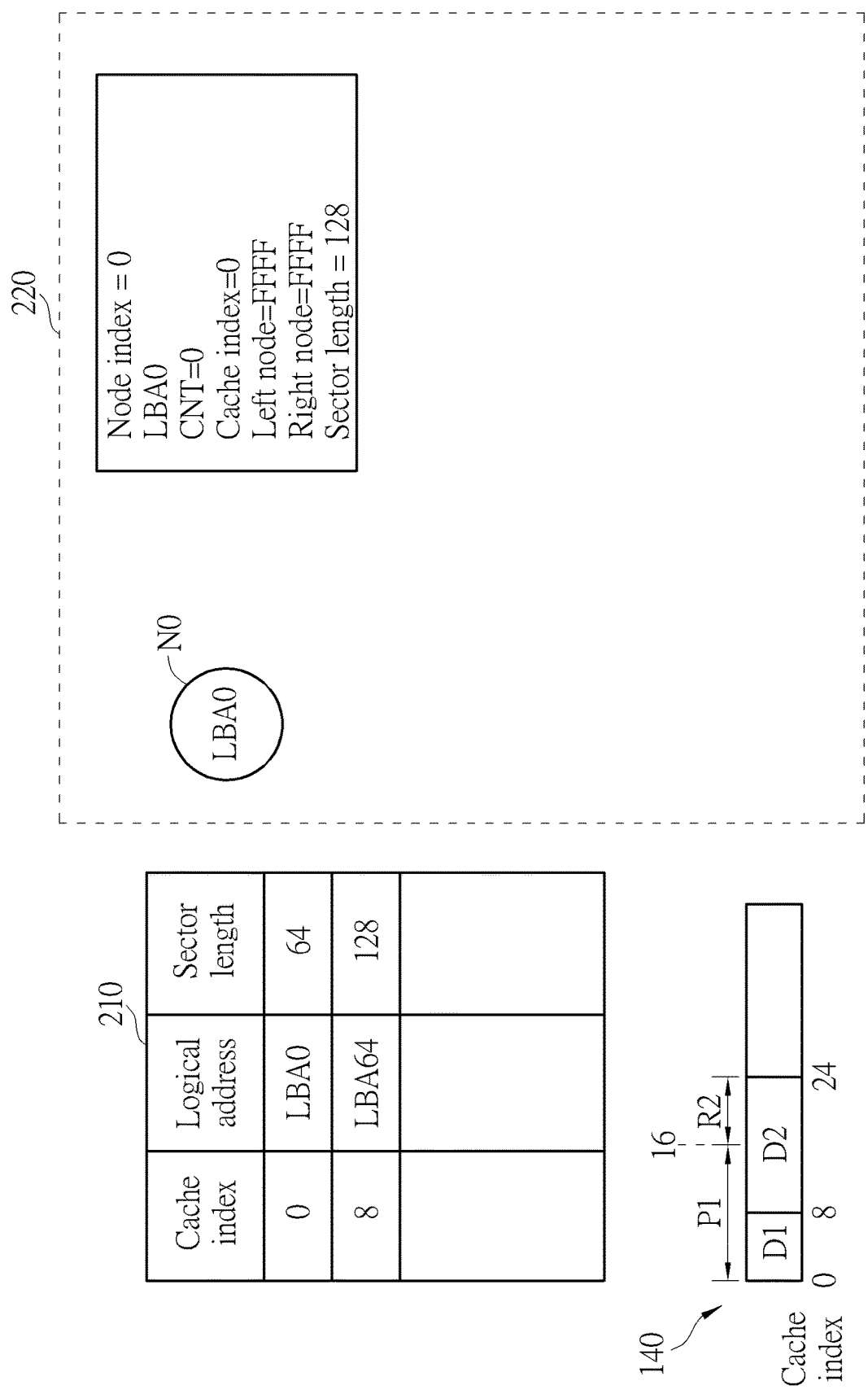
FIG. 11 is a diagram showing an example of operation of the flash memory controller for determining the data D1 and data D2 as one page size data P1 and remaining data portion R2 and for inserting node N0 to update the binary tree when the flash memory controller receives data D2 from the host according to another embodiment of the invention.
Figure 12:
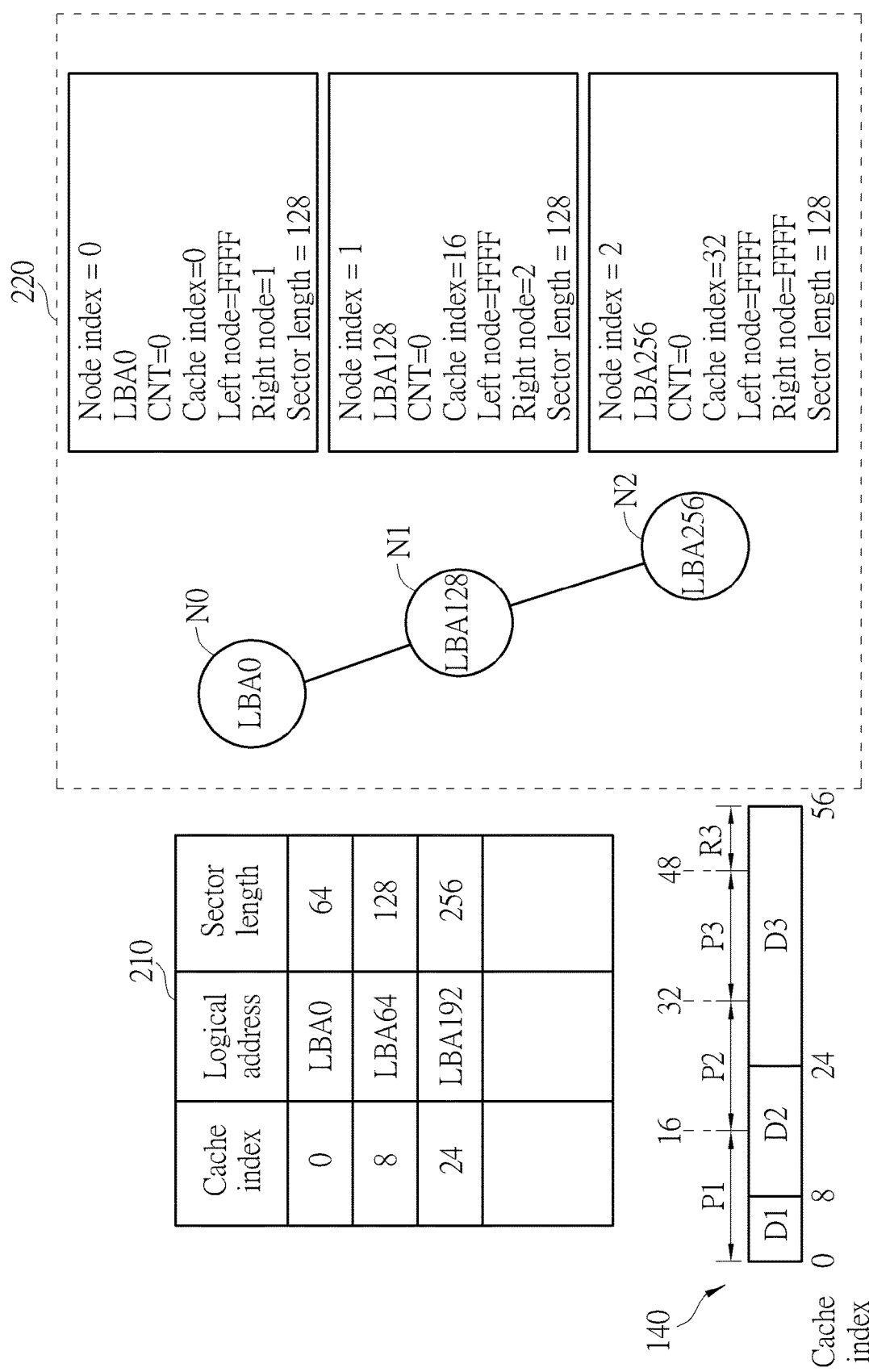
FIG. 12 is a diagram showing an example of operation of the flash memory controller for determining the data D1-D3 as page size data P1-P3 and remaining data portion R3 and for inserting nodes N1 and N2 to update the binary tree when the flash memory controller receives data D3 from the host according to another embodiment of the invention.

FIGS. 10-12 show the examples of operations of the controller 110 for building and updating the binary tree 220 when the flash memory controller 110 receives data from the host 130 according to another embodiment of the invention. The host 130 for example wants to sequentially send the first write command and data D1 with the logical address LBA0, the second write command and data D2 having 128 sectors with the logical address LBA64, and the third write command and data D3 having 256 sectors with the logical address LBA192 to the controller 110 so as to write the above-mentioned data into the flash memory module 120 wherein the data D1 for example has data amount of 64 sectors, the data D2 for example has data amount of 128 sectors, and the data D3 for example has data amount of 256 sectors. The sector is a smaller storage unit of a flash memory and for example one page may comprise 128 sectors. For example, the host 130 may use the sequential write mode to write a large data amount to the memory device 100. Also, in this embodiment, it is assumed that the data size of the minimum writing unit such as one page is equal to 128 sectors (but not limited). The core C0 is arranged to determine whether the host 130 may use the sequential write mode to write data. If the sequential write mode is used, the core C0 is arranged to store a large data amount into cache memory such as the DRAM 140 and then the stored data is sequentially moved from the cache memory to the flash memory module 120. However, this is not meant to be a limitation.

In FIG. 10, when the host 130 sends the first write command and data D1 with the logical address LBA0 to the flash memory controller 110, and the core C0 stores the data D1 with the logical address LBA0 to the cache memory such as DRAM 140 (but not limited). The data D1 is stored in the region corresponding to the cache index "0" of the DRAM 140 and sector length "64", and the DRAM 140 comprises the table 210 recording the cache index "0", the corresponding logical address LBA0, and the sector length "64". In this situation, the data D2 having data amount of 128 sectors is not yet received. Since the data length of the total data amount currently buffered in the DRAM 140, i.e. data D1, is equal to 64 sectors which is smaller than the sector length of one page size data, i.e. 128 sectors, the core C0 is arranged to not to generate flash-memory-based cache information to the core C1 and thus to consider or determine the data D1 as a remaining data portion R1 wherein the core C0 records remaining data information, which comprises a starting cache index of the remaining data portion R1 and corresponding sector length that are not yet used to generate flash-memory-based cache information, i.e. the cache index "0" and sector length "64", in a storage portion of the DRAM 140, as shown in FIG. 10. The core C0 then waits to receive next data from the host 130. The core C0 does not wait for data from the host 130 until the data amount currently buffered in the DRAM 140 is larger than or equal to 128 sectors that is equal to the sector length (i.e. number of sectors) of one page data size. Since the core C0 in this situation does not generate and send flash-memory-based cache information to the core C1 to notify the core C1 of such information, the core C1 does not add or update a node into the binary tree 220. As indicated in FIG. 10, the binary tree 220 includes no nodes.

Then, in FIG. 11, the host 130 sends the second write command and data D2 with the logical address LBA64 to the flash memory controller 110, and the core C0 stores the data D2 with the logical address LBA64 to the DRAM 140. In this embodiment, similarly the data D2 is stored in the region corresponding to the cache index "8" of the DRAM 140 and sector length "128", and the table 210 records the cache index "8", the corresponding logical address LBA64, and the sector length "128". In this situation, the core C0 compares the total data amount currently buffered in the DRAM 140 with the number of sectors defined by the minimum writing unit such as one page to obtain that the total data amount currently buffered in the DRAM 140 is larger than or equal to 128 sectors, and the core C0 arranges or treats the data D1 and data D2 as data P1 of the minimum writing unit and a remaining data portion R2 following such data P1 wherein the data P1 (formed by the data D1 and the first half of data D2) corresponds to a storage region defined by the cache index zero and sector length "128", the remaining data portion R2 (formed by the second half of data D2) corresponds to a storage region defined by the cache index 16 and sector length "64". The core C0 is arranged to determine the logical address of data P1 as LBA0. Then, the core C0 is arranged to notify the core C1 of flash-memory-based cache information of data P1 by sending such cache information to the core C1 wherein such flash-memory-based cache information comprises the cache index "0", logical address LBA0, and the sector length "128". In addition, the starting cache index "16" of the remaining data portion R2 and corresponding sector length "64" are stored by the core C0 in the DRAM 140. Then, when the core C1 is idle, the core C1 updates the binary tree 220 according to the flash-memory-based cache information from the core C0. For example, the logical address LBA0 is the node N0 (top node) of the binary tree 220, and the binary tree 220 also records the node information comprising the logical address (i.e. LBA0), the duplicate count CNT of the logical address LBA0 (because the DRAM 140 has only one logical address LBA0, the duplicate count CNT=0), the cache index "0", the node index of the left node (left child), the node index of the right node (right child), and the sector length "128" (because the data size of one page data is equal to 128 sectors, the length=128). In addition, the node indices of the left node and the right node are "FFFF" because in this condition no nodes follow the top node corresponding to LBA0. In addition, since the remaining data portion R2 exists, the core C0 is arranged to wait to receive next data from the host 130.

Then, in FIG. 12, the host 130 sends the third write command and data D3 with the logical address LBA192 to the flash memory controller 110, and the core C0 stores the data D3 having data amount of 256 sectors with the logical address LBA192 to the DRAM 140. In this embodiment, the data D3 is stored in the storage region corresponding to the cache index "24" of the DRAM 140 and sector length "256", and the table 210 records the cache index "24", the corresponding logical address LBA192, and the sector length "256". Similarly the core C0 determines that the total data amount of a portion (i.e. the second half) of second data and the whole third data is larger than 128 sectors, and the core C0 arranges or treats the remaining data portion R2 in FIG. 11 and the third data as data P2 and P3 respectively corresponding to the minimum writing unit such as one page and a remaining data portion R3 following the data P3 wherein the data P2 corresponds to a storage region defined by the cache index "16" and sector length "128", the data P3 corresponds to a storage region defined by the cache index "32" and sector length "128", and the remaining data portion R3 corresponds to a storage region defined by the cache index "48" and sector length "64". The core C0 is arranged to determine the logical address of data P2 as LBA128 and the logical address of data P3 as LBA256. Then, the core C0 is arranged to generate and send flash-memory-based cache information to the core C1 to notify the core C1 of such cache information wherein such flash-memory-based cache information comprises data P2's cache index "16", logical address LBA128, and the sector length "128", and comprises data P3's cache index "32", logical address LBA256, and the sector length "128". In addition, the starting cache index "48" of the remaining data portion R3 and corresponding sector length "8" are stored by the core C0 in the DRAM 140. Then, when the core C1 is idle, the core C1 updates the binary tree 220 according to the above-received flash-memory-based cache information sent from the core C0. For example, the data P2 corresponding to the logical address LBA128 is indicated by the node N1 (having node index "1") of the binary tree 220, and the information of node N1 records the logical address (i.e. LBA128), the duplicate count CNT of the logical address LBA128 (because the DRAM 140 has only one logical address LBA128, the duplicate count CNT=0), the cache index "16", the node index of the left node (left child), the node index of the right node (right child), and the sector length "128" (because the data size of one page data is equal to 128 sectors, the length=128). In addition, the node N1 follows the top node, and the node index of the right node of the node N0 is updated as "1". In addition, the data P3 corresponding to the logical address LBA256 is indicated by the node N2 (having node index "2") of the binary tree 220, and the information of node N2 records the logical address (i.e. LBA256), the duplicate count CNT of the logical address LBA256 (because the DRAM 140 has only one logical address LBA256, the duplicate count CNT=0), the cache index "32", the node index of the left node (left child), the node index of the right node (right child), and the sector length "128" (because the data size of one page data is equal to 128 sectors, the length=128). In addition, the node N2 follows the node N1, and the node index of the right node of the node N1 is updated as "2".

Similarly, the binary tree 220 in FIG. 12 can be rotated by the core C1 so that the node of logical address LBA128 becomes the top node, the node of logical address LBA0 becomes the left node of the node of logical address LBA128, therefore, the binary tree 220 is updated from three layers to two layers, and the searching speed can be further improved. The operation is similar to the operation of FIG. 5 and is not detailed for brevity. Also, similarly, when data is moved from the DRAM 140 to the flash memory module 120, the table 210 is updated by the core C0, and the binary tree 220 is updated by the core C1.

In one embodiment, if the flash memory controller 110 receives a read command comprising the logical address LBA64 from the host 130 and corresponding data is not yet removed from the DRAM 140, taking the binary tree 220 shown in FIG. 12 as an example, the core C1 compares the logical address LBA64 with the logical address LBA0 and sector length "128" of the top node of the binary tree 220, and the core C1 can find the top node since the logical address LBA64 falls within a storage space defined by the logical address LBA0 and sector length "128". If the read command requests data defined by the logical address LBA64 and sector length "128", then the core C1 can find the node of logical address LBA0 and the node of logical address LBA128 in the binary tree 220 to obtain corresponding cache information so that the core C0 can send corresponding data to the host 130 based on the obtained cache information obtained from the core C1.

It should be noted that when data is moved from the DRAM 140 to the flash memory module 120 one page data by one page data, the core C1 in the idle time can directly delete a corresponding node and information without computing and adding new node(s) and corresponding node information to the binary tree 220. Since the binary tree 220 may be also stored in the cache such as DRAM 140, computation overhead and the frequency of accessing the DRAM 140 can be significantly reduced.

Further, it should be noted that in other embodiments the logical address of any two received data sequentially sent from the host 130 to the controller 110 can be discontinuous. The above examples are not meant to be limitations.

Figure 13:
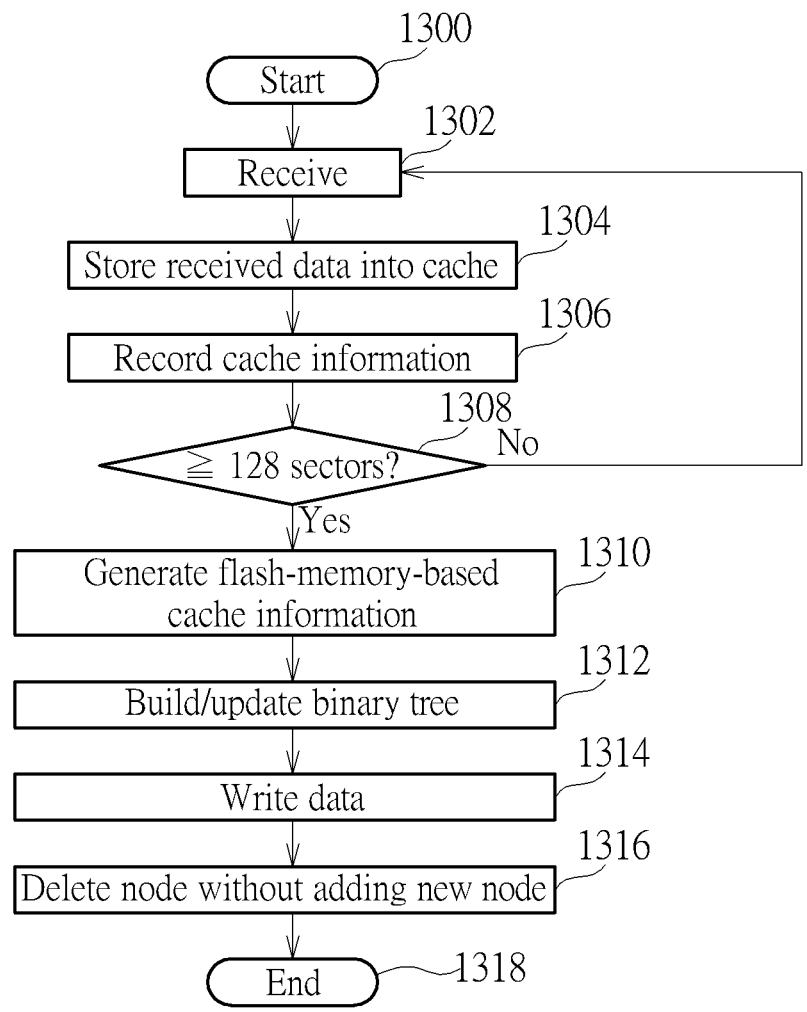
FIG. 13 is a flowchart diagram of a method for building or updating the binary tree when receiving data from the host according to another embodiment of the invention.

FIG. 13 is a flowchart diagram of a method for building or updating the binary tree 220 when receiving data from the host 130 according to another embodiment of the invention. Refer to FIGS. 10-12 and above descriptions, the flow is described as follows.

Step 1300: Start;

Step 1302: Receive data from the host 130;

Step 1304: Core C0 stores/buffers the received data into a cache within the flash memory controller 110;

Step 1306: Core C0 uses table 210 to record cache information comprising cache index, logical address, and data length of the received data;

Step 1308: Core C0 monitors the data amount currently cached in the cache to determine whether to generate and send flash-memory-based cache information to the core C1; if the monitored data amount is larger than or equal to the data size of one minimum writing unit such as one page data size, e.g. 128 sectors, then the flow proceeds to Step 1310, otherwise, the flow proceeds to Step 1302 to receive other data;

Step 1310: Core C0 generates and sends corresponding flash-memory-based cache information to the core C1;

Step 1312: Core C1 builds or updates a binary tree based on the corresponding flash-memory-based cache information;

Step 1314: Core C1 moves one page size data from the cache such as DRAM 140 to write such page size data into a page of the flash memory module 120 by controlling the DRAM controller 114 and control logic circuit 116;

Step 1316: Core C1 when idle deletes one or more nodes from the binary tree and resets corresponding flash-memory-based cache information as the default value "FFFF" without adding new nodes into the binary tree; and Step 1318: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, comprising:
   an interface circuit, coupled between a host and an internal bus;
   a read-only memory, coupled to the internal bus, for storing a program code;
   a control logic circuit, coupled between the internal bus and a flash memory module which is externally coupled to the flash memory controller;
   a processor, coupled to the internal bus, for executing the program code to perform access of the flash memory module by using the control logic circuit; and
   a cache, coupled to the internal bus, for buffering data corresponding to a plurality of sequential write commands;
   wherein the processor is arranged to build or update a binary tree only when a data amount of data buffered in the cache exceeds data amount of a minimum writing unit within the flash memory module; in response to a read command from the host for certain data, the processor is arranged to searching the binary tree to determine whether to access the flash memory module for the certain data; after buffered data having the data amount of the minimum writing unit has been written to the flash memory module, the processor deletes one or more nodes from the binary tree without adding new nodes into the binary tree.

2. The flash memory controller of claim 1, wherein the processor comprises a first core and a second core; when the data amount of the data buffered in the cache is smaller than the data amount of the minimum writing unit, the first core is arranged to wait to receive next data sent from the host without notifying the second core of cache information; when the data amount of the data buffered in the cache is not smaller than the data amount of the minimum writing unit, the first core is arranged to generate and send flash-memory-based cache information to the second core so that the second core builds or updates a binary tree by adding a specific node into the binary tree wherein the specific node has node information comprising a node index, a logical address corresponding to data buffered in the cache, a cache index corresponding to the data buffered in the cache, a left node, a right node, a sector length corresponding to the data amount of the minimum writing unit.

3. The flash memory controller of claim 2, wherein the second core is arranged to delete a node of the binary tree without adding a new node into the binary tree when after buffered data having the data amount of the minimum writing unit has been written to the flash memory module.

4. The flash memory controller of claim 1, wherein a sector length corresponding to the data amount of the minimum writing unit is a fixed sector length corresponding a data size of one page data within the flash memory module.

5. A memory device, comprising:
   a flash memory module; and
   the flash memory controller of claim 1.

6. A method of a flash memory controller, comprising:
   providing an interface circuit, coupled between a host and an internal bus;
   providing a control logic circuit, coupled between the internal bus and a flash memory module which is externally coupled to the flash memory controller, the flash memory module having a plurality of chips each comprising a plurality of pages each comprising a plurality of sectors;
   providing a cache coupled to the internal bus to buffer data corresponding to a plurality of sequential write commands;
   utilizing a processor to build or update a binary tree only when a data amount of data buffered in the cache exceeds data amount of a minimum writing unit within the flash memory module;
   in response to a read command from the host for certain data, utilizing the processor to search the binary tree to determine whether to access the flash memory module for the certain data; and
   after buffered data having the data amount of the minimum writing unit has been written to the flash memory module, utilizing the processor to delete one or more nodes from the binary tree without adding new nodes into the binary tree.

7. The method of claim 6, further comprising:
   when the data amount of the data buffered in the cache is smaller than the data amount of the minimum writing unit, using a first core of the processor to wait to receive next data sent from the host without notifying a second core of the processor of cache information; and
   when the data amount of the data buffered in the cache is not smaller than the data amount of the minimum writing unit, using the first core to generate and send the flash-memory-based cache information to the second core so that the second core builds or updates a binary tree by adding a specific node into the binary tree wherein the specific node has node information comprising a node index, a logical address corresponding to data buffered in the cache, a cache index corresponding to the data buffered in the cache, a left node, a right node, a sector length corresponding to the data amount of the minimum writing unit.

8. The method of claim 7, further comprising:
   using the second core to delete a node of the binary tree without determining adding a new node into the binary tree when moving data corresponding to the node from the cache into the flash memory module.

9. The method of claim 7, wherein a sector length corresponding to the data amount of the minimum writing unit is a fixed sector length corresponding a data size of one page data within the flash memory module.

* * * * *